United States Patent
Mazzucco et al.

(10) Patent No.: US 10,604,645 B2
(45) Date of Patent: Mar. 31, 2020

(54) OLEFIN POLYMERIZATION PROCESS IN THE PRESENCE OF ANTISTATIC COMPOSITION

(71) Applicant: BASELL POLIOLEFINE ITALIA S.R.L., Milan (IT)

(72) Inventors: Antonio Mazzucco, Ferrara (IT); Gabriele Mei, Ferrara (IT); Tiziana Caputo, Ferrara (IT); Roberto Pantaleoni, Ferrara (IT); Enrico Balestra, Ferrara (IT); Maria Di Diego, Ferrara (IT); Mara Destro, Ferrara (IT); Riccardo Rinaldi, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 58 days.

(21) Appl. No.: 16/064,900

(22) PCT Filed: Nov. 28, 2016

(86) PCT No.: PCT/EP2016/078940
§ 371 (c)(1),
(2) Date: Jun. 21, 2018

(87) PCT Pub. No.: WO2017/108337
PCT Pub. Date: Jun. 29, 2017

(65) Prior Publication Data
US 2019/0023885 A1    Jan. 24, 2019

(30) Foreign Application Priority Data

Dec. 21, 2015   (EP) ...................................... 15201730
Jul. 20, 2016   (EP) ...................................... 16180369

(51) Int. Cl.
*C08L 23/12*   (2006.01)
*C08F 2/00*    (2006.01)
*C08F 2/38*    (2006.01)

(52) U.S. Cl.
CPC ................ *C08L 23/12* (2013.01); *C08F 2/00* (2013.01); *C08F 2/38* (2013.01)

(58) Field of Classification Search
CPC ...... C08F 2/00; C08F 2/38; C08F 2/18; C08F 2/20; C08F 2/22; C08F 2/24; C08L 23/12
See application file for complete search history.

(56) References Cited

U.S. PATENT DOCUMENTS

| | | | |
|---|---|---|---|
| 6,111,034 A | 8/2000 | Goode et al. | |
| 2011/0223314 A1* | 9/2011 | Zhang et al. | B01F 3/0807 427/2.1 |

FOREIGN PATENT DOCUMENTS

| | | | |
|---|---|---|---|
| EP | 0107127 A1 | 5/1984 |
| EP | 0453116 A1 | 10/1991 |
| EP | 1308464 A1 | 5/2003 |
| EP | 2813520 A1 | 12/2014 |

OTHER PUBLICATIONS

Clariant Industrial and Consumer Specialities: "Product data sheet Polyglyko PE-K 270", Internet, Aug. 27, 2015 (Aug. 27, 2015) XP002766120, Retrieved from the Internet: URL:https://www.clariant.com/en/Solutions/Products/2015/08/27/15/27/Polyglykol-PEK270.

Burckhardt Compression, Clarriant Polyglykol PE-K 270—Suitability for Use in Ethylene Hypercompressors, Aug. 24, 2011, Hansruedi Staheli.

* cited by examiner

*Primary Examiner* — Nathan M Nutter

(57) ABSTRACT

A process for the preparation of polyolefins carried out in the presence of an antistatic composition made from or containing:
a) a compound of formula R—OH wherein R represents hydrogen or a linear or branched, saturated alkyl group having from 1 to 15 carbon atoms; and
b) an oligomeric or polymeric organic compound having one or more terminal hydroxyl groups and a viscosity at 40° C. of at least about 20 mm$^2$/sec (DIN 51562).

13 Claims, 5 Drawing Sheets

OLEFIN POLYMERIZATION PROCESS IN THE PRESENCE OF ANTISTATIC COMPOSITION

This application is the U.S. National Phase of PCT International Application PCT/EP2016/078940, filed Nov. 28, 2016, claiming benefit of priority to European Patent Application No. 15201730.7, filed Dec. 21, 2015 and European Patent Application No. 16180369.7, filed Jul. 20, 2016, the contents of which are incorporated herein by reference in its entirety.

FIELD OF THE INVENTION

In general, the present disclosure relates to the field of chemistry. More specifically, the present disclosure relates to polymer chemistry. In particular, the present disclosure relates to a process for the preparation of polyolefins carried out in the presence of an antistatic composition and the antistatic composition itself.

BACKGROUND OF THE INVENTION

Antistatic agents are used in processes for the polymerization of olefins to avoid electrostatic charging. It is believed that the antistatic agents reduce wall sheeting and formation of polymer agglomerates in the polymerization reactor and downstream equipment. In some instances, antistatic agents include antifouling agents, polymerization process aids, activity inhibitors, productivity inhibitors or kinetic modifiers. Antistatic agents are made from or contain polar functional groups. In some instances, the polar functional groups are selected from the group consisting of acid groups, ester groups, amine groups, amide groups, hydroxyl groups, and ether groups. In some instances, antistatic agents are selected from the group consisting of polysulfone copolymers, polymeric polyamines, polyalcohols, hydroxyesters of polyalcohols, salts of alkylarylsulfonic acids, polysiloxanes, alkoxyamines, and polyglycol ethers.

It is believed that some antistatic agents may negatively impact the activity of olefin polymerization catalysts. It is also believed that the use of some antistatic agents in the preparation of polyolefins may prevent the use of those polyolefins in food, beverage and medical packaging.

It is believed that water and other light polar compounds are less efficient than other antistatic agents. Notably, it is believed that water acts indistinctly on growing polymer particles independently from their size while other more efficient antistatic agents interact preferentially with the smaller particles that have higher capability to react with each other and generate melted agglomerates.

SUMMARY OF THE INVENTION

In a general embodiment, the present disclosure provides a process for the preparation of polyolefins including the step of polymerizing an olefin in the presence of a polymerization catalyst and of an antistatic composition made from or containing:
(a) from about 0.5 to about 50% by weight, based upon the total weight of the antistatic composition, of a compound of formula R—OH wherein R represents hydrogen or a linear or branched, saturated alkyl group having from 1 to 15 carbon atoms; and
(b) from about 50 to about 99.5% by weight, based upon the total weight of the antistatic composition, of an oligomeric or polymeric organic compound having one or more terminal hydroxyl groups and a viscosity at 40° C. of at least about 20 mm$^2$/sec (DIN 51562).

In a general embodiment, the present disclosure provides an antistatic composition made from or containing:
(a) from about 0.5 to about 50% by weight, based upon the total weight of the antistatic composition, of a compound of formula R—OH wherein R represents hydrogen or a linear or branched, saturated alkyl group having from 1 to 15 carbon atoms; and
(b) from about 50 to about 99.5% by weight, based upon the total weight of the antistatic composition, of an oligomeric or polymeric organic compound having one or more terminal hydroxyl groups and a viscosity at 40° C. of at least about 20 mm$^2$/sec (DIN 51562).

DETAILED DESCRIPTION OF THE INVENTION

Figure 1:
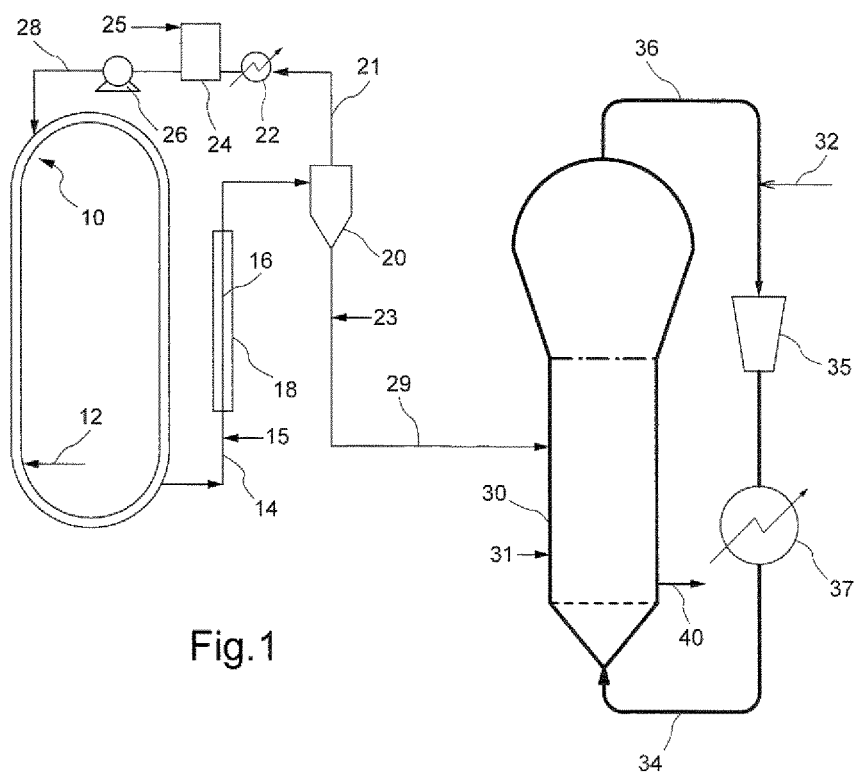
FIG. 1 depicts schematically a set-up of a fluidized bed gas phase reactor for carrying out an embodiment of the process for the preparation of polyolefins of the present disclosure.

In some embodiments, the compound (a) of formula R—OH is water. In some embodiments, the compound (a) of formula R—OH is an alcohol selected from the group consisting of methanol, ethanol, 1-propanol, 1-butanol, 1-pentanol, 1-hexanol, 1-heptanol, 1-octanol, 1-nonanol, 1-decanol, undecan-1-ol, dodecan-1-ol, tridecan-1-ol, 1-tetradecanol, pentadecan-1-ol, isobutanol, isoamyl alcohol, 2-methyl-1-propanol, phenethyl alcohol, tryptophol, isopropanol, 2-butanol, 2-pentanol, 2-hexanol, 2-heptanol, cyclohexanol, tert-butyl alcohol, tert-amyl alcohol, 2-methyl-2-pentanol, 2-methylhexan-2-ol, 2-methylheptan-2-ol, 3-methyl-3-pentanol and 3-methyloctan-3-ol.

In some embodiments, the oligomeric or polymeric organic compound (b) has a viscosity at 40° C. (DIN 51562) of about 30 to about 2000 mm$^2$/sec, alternatively of about 50 to about 1500 mm$^2$/sec, alternatively of about 100 to about 1000 mm$^2$/sec, alternatively of about 150 to about 500 mm$^2$/sec, alternatively of about 200 to about 400 mm$^2$/sec, alternatively of about 250 to about 300 mm$^2$/sec, alternatively of about 260 to about 285 mm$^2$/sec. In some embodiments, the viscosity at 40° C. (DIN 51562) of the oligomeric or polymeric organic compound (b) is in the range of about 260 to about 285 mm$^2$/sec.

In some embodiments, the oligomeric or polymeric organic compound (b) is selected from the group consisting of alcohols, polyethers, polyalcohols, hydroxyesters of polyalcohols, polyglycol ethers, polyglycol esters and derivatives thereof.

In some embodiments, the oligomeric or polymeric organic compound (b) is a polyether. In some embodiments, the oligomeric or polymeric organic compound (b) is an alkylene-oxide-derived polymer made from or containing on average from 10 to 200 repeating units —(CH$_2$—CHR—O)—, with R being hydrogen or an alkyl group having from 1 to 6 carbon atoms.

In some embodiments, the terminal groups of the alkylene-oxide-derived polymer are —OH groups.

In some embodiments, the alkylene-oxide-derived polymer is a random copolymer of ethylene oxide and another alkylene oxide, and the repeating units —(CH$_2$—CH$_2$—O)$_n$— derived from ethylene oxide to repeating units —(CH$_2$—CHR'—O)$_m$— derived from the other alkylene oxides, with R' being an alkyl group having from 1 to 6 carbon atoms, are present in a ratio n:m in the range of from 6:1 to 1:1, alternatively in the range of from 5:1 to 1.5:1, alternatively in the range of from 4:1 to 2:1.

In some embodiments, the alkylene-oxide-derived polymer is a linear polymer of formula (I)

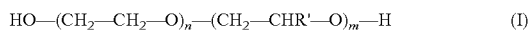

wherein R' is an alkyl group having from 1 to 6 carbon atoms, or an alkyl group having from 1 to 3 carbon atoms, or a methyl group; n is in the range of from 10 to 180, alternatively from 20 to 100, alternatively from 30 to 50; m is in the range of from 2 to 120, alternatively from 10 to 80, alternatively from 10 to 40; n and m denoting the average number of repeating units.

In some embodiments, alkylene-oxide-derived polymer is a random copolymer of ethylene oxide and propylene oxide.

In some embodiments, the ethylene oxide/propylene oxide copolymer is a linear ethylene oxide/propylene oxide copolymer of formula (II)

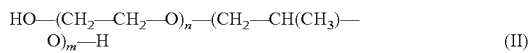

wherein n is in the range of from 10 to 180, alternatively from 20 to 100, alternatively from 30 to 50 and m is in the range of from 2 to 120, alternatively from 10 to 80, alternatively from 10 to 40.

In some embodiments, the alkylene-oxide-derived polymers are prepared by reacting ethylene oxide and the other alkylene oxides with polyhydric alcohols. In some embodiments, the other alkylene oxide is propylene oxide. In some embodiments, the, polyhydric alcohol is selected from the group consisting of diols, triols, and polyols. In some embodiments, the diol is ethylene glycol. In some embodiments, the triol is glycerol. In some embodiments, the polyol is pentaerythritol. The reaction with diols results in linear polymers.

In some embodiments, the oligomeric or polymeric organic compound (b) is water-soluble. In the context of the present description, "water-soluble" means soluble in water at room temperature, that is, at about 23° C.

In some embodiments, the amount of antistatic composition introduced into the polymerization reactor is from about 1 to about 5000 ppm per weight, based upon the weight of the prepared polyolefin, alternatively from about 10 to about 3000 ppm per weight, alternatively from about 50 to about 1000 ppm per weight.

In some embodiments, the amount of component (a) introduced into the polymerization reactor is from about 1 to about 70 ppm per weight, based upon the weight of the prepared polyolefin, alternatively from about 1 to about 50 ppm per weight, alternatively from about 2 to about 40 ppm per weight, alternatively from about 2 to about 30 ppm per weight, alternatively from about 3 to about 30 ppm per weight, alternatively from about 3 to about 20 ppm per weight.

In some embodiments, the amount of component (a) in the antistatic composition introduced into the polymerization reactor is from about 0.5 to about 50% by weight, based upon the total weight of the antistatic composition, alternatively from about 3 to about 30% by weight, alternatively from about 5 to about 15% by weight.

In some embodiments, the amount of component (b) in the antistatic composition introduced into the polymerization reactor is about from 50 to about 99.5% by weight, based upon the total weight of the antistatic composition, alternatively from about 70 to about 97% by weight, alternatively from about 85 to about 95% by weight.

In some embodiments, the antistatic composition is provided to the polymerization process as a pre-prepared mixture. In some embodiments, components (a) and (b) of the antistatic composition are separately provided to the polymerization process.

In some embodiments, the antistatic composition or individual components thereof are fed to the polymerization reactor in a flow of saturated or unsaturated hydrocarbon having from 2 to 6 carbon atoms. In some embodiments, the hydrocarbon is a monomer. In some embodiments, the monomer is propylene. In some embodiments, the hydrocarbon is an alkane. In some embodiments, the alkane is propane. In some embodiments, the monomer or the alkane is in liquid or gas form. In some embodiments, the antistatic composition or components and the hydrocarbon are homogenized at short distance from the injection point by mixing/homogenizing/dispersing systems. In some embodiments, the system contains static mixers, thereby creating an emulsion of small droplets of the antistatic dispersed phase into the hydrocarbon continuous phase.

In some embodiments, the antistatic composition is fed directly into the reactor, a line leading to the reactor, or a line exiting the reactor. In some embodiments, the components of the antistatic composition are fed separately. In some embodiments, the antistatic composition is fed in at least one of the following locations:
  upstream or into a catalyst precontacting vessel, that is, a vessel in which the catalyst components are brought into contact with each other;
  upstream or into a prepolymerization reactor;
  at any other point upstream a polymerization reactor;
  into a reactor or in any recirculation flow thereof;
  in the polymer discharge out of a polymerization reactor;
  in the unreacted monomer separation and finishing sections downstream the polymerization reactor(s).

In some embodiments, the process is a cascade process with one or more liquid or gas phase reactors. In some of those embodiments, the antistatic composition is fed in a previously-described location or at any point between two reactors. In some embodiments, the antistatic composition is fed into the bed of a fluidized bed gas phase reactor or the bed of a fast fluidization bed or of a packed bed of a riser or downer of a multizone circulating reactor.

In some embodiments, the process is for the polymerization of 1-olefins, that is hydrocarbons having terminal double bonds. In some embodiments, the 1-olefins are selected from the group consisting of linear 1-alkenes, branched 1-alkenes having from 2 to 12 carbon atoms or branched 1-alkenes having from 2 to 10 carbon atoms, conjugated dienes, non-conjugated dienes, and vinyl-aromatic. In some embodiments, the linear alkenes are selected from the group consisting of linear 1-alkenes having from 2 to 10 carbon atoms. In some embodiments, the linear alkenes are selected from the group consisting of ethylene, propylene, 1-butene, 1-pentene, 1-hexene, 1-heptene, 1-octene, and 1-decene. In some embodiments, the 1-olefins are branched 1-alkenes having from 2 to 10 carbon atoms. In some embodiments, the branched 1-alkene is 4-methyl-1-pentene. In some embodiments, the diene is selected from the group consisting of 1,3-butadiene, 1,4-hexadiene, and 1,7-octadiene. In some embodiments, the vinyl-aromatic compounds are selected from the group consisting of styrene or substituted styrene. In some embodiments, the olefins have the double bond as part of a cyclic structure. In some embodiments, the cyclic structure has more than one ring systems. In some embodiments, the cyclic olefin is selected from the group consisting of cyclopentene, norbornene, tetracyclododecene, methylnorbornene, 5-ethylidene-2-norbornene, norbornadiene, and ethylnorbornadiene. In some embodiments, the process involves the polymerization of a mixture of two or more olefins.

In some embodiments, the process is selected from the group consisting of the homopolymerization of ethylene, the copolymerization of ethylene, the homopolymerization of propylene, and the copolymerization of propylene. In some embodiments, comonomers for use in ethylene polymerization are selected from the group consisting of 1-alkenes having from 3 to 8 carbon atoms in amount of up to about 20 wt. %, based upon the total weight of the ethylene copolymer, alternatively from about 0.01 wt. % to about 15 wt. %, alternatively from about 0.05 wt. % to about 12 wt. %. In some embodiments, the 1-alkenes are selected from the group consisting of 1-butene, 1-pentene, 1-hexene, and 1-octene. In some embodiments, comonomers for use in propylene polymerization are selected from the group consisting of ethylene, 1-butene, and 1-hexene in amount of up to about 40 wt. %, based upon the total weight of the propylene copolymer, alternatively from about 0.5 wt. % to about 35 wt. %.

In some embodiments, the prepared olefin polymers are broad molecular weight olefin polymers. In some embodiments, the prepared olefin polymers are multimodal olefin polymers. Herein, the term "multimodal" refers to the modality of the molecular weight distribution. Herein, the term "multimodal" includes bimodal. In some embodiments, the polymers are obtained from polymerizing olefins in a cascade of two or more polymerization reactors or in different zones of a multizone reactor under different reaction conditions. The "modality" indicates how many different polymerization conditions were utilized to prepare the polyolefin, independently whether this modality of the molecular weight distribution can be recognized as separated maxima in a gel permeation chromatography (GPC) curve or not. In some embodiments, the olefin polymer has a molecular weight distribution and a comonomer distribution. In some embodiments, the average comonomer content of polymer chains with a higher molecular weight is higher than the average comonomer content of polymer chains with a lower molecular weight. In some embodiments, identical or very similar reaction conditions are used in the polymerization reactors of the reaction cascade, thereby preparing narrow molecular weight or monomodal olefin polymers.

In some embodiments, the polymerization is carried out using titanium-based Ziegler-Natta-catalysts, Phillips catalysts based on chromium oxide, or single-site catalysts. As used herein, single-site catalysts are catalysts based on chemically uniform transition metal coordination compounds. In some embodiments, mixtures of two or more of these catalysts are used for the polymerization of olefins. Such mixed catalysts may be designated as hybrid catalysts.

In some embodiments, catalysts for the process are Ziegler-Natta catalysts made from or containing:
(i) a solid catalyst component made from or containing Mg, Ti, an halogen and an electron donor compound (internal donor),
(ii) an alkylaluminum compound, and
(iii) optionally, an electron-donor compound (external donor).

In some embodiment, component (i) is prepared by contacting a magnesium halide, a titanium compound having at least a Ti-halogen bond, and optionally an electron donor compound. In some embodiments, the magnesium halide is $MgCl_2$ in active form. In some embodiments, the titanium compounds are selected from the group consisting of $TiCl_4$, $TiCl_3$, and Ti-haloalcoholates of formula $Ti(OR)_{n-y}X_y$, where n is the valence of titanium, y is a number between 1 and n−1 X is halogen and R is a hydrocarbon radical having from 1 to 10 carbon atoms.

In some embodiments, electron donor compounds for preparing Ziegler type catalysts are selected from the group consisting of alcohols, glycols, esters, ketones, amines, amides, nitriles, alkoxysilanes and aliphatic ethers. In some embodiments, the electron donor compounds are used alone. In some embodiments, the electron donor compounds are used in mixtures with other electron donor compounds.

In some embodiments, other solid catalyst components are based on a chromium oxide supported on a refractory oxide and activated by a heat treatment. In some embodiments, the refractory oxide is silica. In some embodiments, the catalysts consist of chromium (VI) trioxide chemically fixed on silica gel. These catalysts are produced under oxidizing conditions by heating the silica gels that have been doped with chromium(III)salts (precursor or precatalyst). During this heat treatment, the chromium(III) oxidizes to chromium(VI), the chromium(VI) is fixed and the silica gel hydroxyl group is eliminated as water.

In some embodiments, the other solid catalyst components are single-site catalysts supported on a carrier. In some embodiments, those single-site catalysts are metallocene catalysts made from or containing:
  at least a transition metal compound containing at least one n bond; and
  at least a cocatalyst selected from an alumoxane or a compound able to form an alkylmetallocene cation.

In some embodiments, when the catalyst includes an alkylaluminum compound, the molar ratio of component (a) to alkylaluminum compound introduced into the polymerization reactor is from about 0.05 to about 3, alternatively from about 0.1 to about 2, or from about 0.5 to about 1.

In some embodiments, the catalysts are subjected to prepolymerization before being fed to the polymerization reactor. In some embodiments, the prepolymerization occurs in a loop reactor. In some embodiments, the prepolymerization of the catalyst system is carried out at a temperature in a range of from about 0° C. to about 60° C.

In some embodiments, the process is carried out in any polymerization plant including a liquid-phase or a gas-phase polymerization reactor. In some embodiments, the liquid-phase reactors are selected from the group consisting of loop reactors and continuously stirred tank reactors (CSTR). In some embodiments, the gas-phase reactors are selected from the group consisting of fluidized bed reactors, stirred bed reactors, and reactors having two interconnected polymerization zones as described in European Patent Application Nos. EP 0782587 and EP 1012195, both incorporated herein by reference. In some embodiments, the process is carried out in two or more cascade reactors, giving rise to a sequential multistage polymerization process. In some embodiments, a fluidized bed reactor is used to prepare a first polymer component, which is successively fed to a gas-phase reactor having two interconnected polymerization zones to prepare a second and a third polymer component. In some embodiments, a first fluidized bed reactor is used to prepare a first polymer component, which is successively fed to a second fluidized bed reactor to prepare a second polymer component and then to a third fluidized bed reactor to prepare a third polymer component. In some embodiments, a polymer with a multi-modal molecular weight distribution is obtained. In some embodiments, an olefin copolymer made from or containing two or more components having a different comonomer content is prepared.

In some embodiments, the polymerization process is carried out as gas-phase polymerization, that is, by a process in which the solid polymers are obtained from a gas-phase of the monomer or the monomers. In some embodiments, the gas-phase polymerizations are carried out at pressures of from about 0.1 to about 20 MPa, alternatively from about 0.5 to about 10 MPa, alternatively from about 1.0 to about 5 MPa, and polymerization temperatures from about 40 to about 150° C., alternatively from about 65 to about 125° C.

In some embodiments, gas-phase polymerization reactors are selected from the group consisting of horizontally stirred reactors, vertically stirred reactors, fluidized bed gas-phase reactors, or multizone circulating reactors.

Fluidized-bed polymerization reactors are reactors in which the polymerization takes place in a bed of polymer particles which is maintained in a fluidized state by feeding in gas at the lower end of a reactor and taking off the gas again at its upper end. In some embodiments, the gas is fed below a gas distribution grid having the function of dispensing the gas flow. The reactor gas is then returned to the lower end to the reactor via a recycle line equipped with a compressor and a heat exchanger. In some embodiments, the circulated reactor gas is a mixture of the olefins to be polymerized, inert gases, and optionally a molecular weight regulator such as hydrogen. In some embodiments, the inert gases are selected from the group consisting of nitrogen and/or lower alkanes such as ethane, propane, butane, pentane or hexane. In some embodiments, nitrogen or propane is used as inert gas in combination with lower alkanes. The velocity of the reactor gas fluidizes the mixed bed of finely divided polymer present in the tube serving as polymerization zone and removes the heat of polymerization. In some embodiments, the polymerization is carried out in a condensed or super-condensed mode, in which part of the circulating reaction gas is cooled to below the dew point and returned to the reactor separately as a liquid and a gas-phase or together as a two-phase mixture in order to make additional use of the enthalpy of vaporization for cooling the reaction gas.

Multizone circulating reactors are gas-phase reactors in which two polymerization zones are linked to one another and the polymer is passed alternately a plurality of times through these two zones. In some embodiments, the reactors are as described in Patent Cooperation Treaty Publication Nos. WO 97/04015 A1 and WO 00/02929 A1, both incorporated herein by their entirety, and have two interconnected polymerization zones, a riser, in which the growing polymer particles flow upward under fast fluidization or transport conditions and a downcomer, in which the growing polymer particles flow in a densified form under the action of gravity. The polymer particles, leaving the riser, enter the downcomer and the polymer particles, leaving the downcomer, are reintroduced into the riser, thereby establishing a circulation of polymer between the two polymerization zones and the polymer is passed alternately a plurality of times through these two zones. In some embodiments, the two polymerization zones of one multizone circulating reactor are operated with different polymerization conditions by establishing different polymerization conditions in its riser and its downcomer. In some embodiments, the gas mixture leaving the riser and entraining the polymer particles is partially or totally prevented from entering the downcomer. In some embodiments, a barrier fluid is fed in form of a gas or a liquid mixture into the downcomer, in the upper part thereof. In some embodiments, the barrier fluid has a composition different from that of the gas mixture present in the riser. In some embodiments, the amount of added barrier fluid is adjusted in a way that an upward flow of gas countercurrent to the flow of the polymer particles is generated, thereby acting as a barrier to the gas mixture entrained among the particles coming from the riser. In some embodiments, the countercurrent occurred at the top thereof. In some embodiments, two different gas composition zones occurred in one multizone circulating reactor. In some embodiments, make-up monomers, comonomers, molecular weight regulator, or inert fluids are introduced at any point of the downcomer, below the barrier feeding point. In some embodiments, the molecular weight regulator is hydrogen. In some embodiments, varying monomer, comonomer and hydrogen concentrations along the downcomer are used to differentiate polymerization conditions.

A cascade polymerization reactor, representing an embodiment, is depicted schematically in FIG. 1.

The slurry polymerization of liquid propylene is carried out in a loop reactor 10. Catalyst components, co-catalyst, and propylene are introduced into the loop reactor, as shown by arrow 12. For a Ziegler/Natta catalyst made from or containing a solid component supported on active MgCl2, the solid component is fed as such or in a pre-polymerized form.

Loop reactor 10 is the first polymerization reactor of the process. In some embodiments, there are other reactor(s) upstream of reactor 10. Reactor 10 receives, from line 12, a polymer produced in other upstream reactor(s), a prepolymer, a polymerization catalyst, or catalyst component. Feed lines for catalyst, monomer, molecular weight regulator and other possible ingredients are omitted.

While most of the polymer slurry is continuously recirculated in the loop reactor 10, a fraction is continuously discharged to a transfer line 14, connected to a flash chamber 20. The transfer line 14 includes a pipe 16 equipped with a heater 18. In some embodiments, the heater is a steam jacketed pipe. Upon discharge from reactor 10, the polymer slurry is depressurized. During conveyance through pipe 16 of transfer line 14, the slurry is heated and brought to a temperature higher than the temperature within the loop reactor 10. Under these conditions, liquid propylene is evaporated. A turbulent flow of a tri-phase stream made from or containing polymer, liquid monomers, and gaseous monomers is generated inside the pipe 16.

At the outlet of jacketed pipe 16, a two-phase stream containing evaporated monomers and polymer particles is conveyed to flash chamber 20, where the pressure is decreased. The particles of solid polymer fall by gravity towards the bottom of flash chamber 20 while the gaseous monomers flow upwards to the top of chamber 20. The gaseous monomers are collected and sent via line 21 to a monomer recovery section including a cooler 22, a monomer make-up unit 24, and a compressor 26. Fresh propylene supplied as shown by arrow 25 and recycled propylene from flash chamber 20 are fed via 28 to loop reactor 10 for continued polymerization.

Propylene polymer discharged from flash tank 20 is transferred via line 29 to a fluidized-bed gas-phase reactor 30, where a propylene copolymer is generated on the homo-PP particles coming from the loop reactor 10. In some embodiments, the propylene copolymer is an ethylene propylene elastomeric copolymer. Reactor 30 is operated at a pressure between about 10 and about 30 bar and at a temperature between about 50 and about 110° C. Fresh monomers 32 are fed to reactor 30 through line 34, unreacted monomers are recycled through line 36 equipped with a compressor 35 and a heat exchanger 37 placed downstream the compressor 35, and the heterophasic copolymer or impact PP is discharged from line 40. In some embodiments, the product is transferred to the finishing section of the plant or a second gas-phase reactor (not shown) for enrichment in the copolymer fraction.

The antistatic composition is added to the polymer discharge downstream the discharge from the loop reactor 10 and upstream the inlet of jacketed pipe 16 (point 15). In some embodiments, the antistatic composition is added to the polymer discharged from flash tank 20 (point 23). In some embodiments, the antistatic composition is added into the bed of the fluidized-bed gas-phase reactor 30 (point 31).

Figure 2:
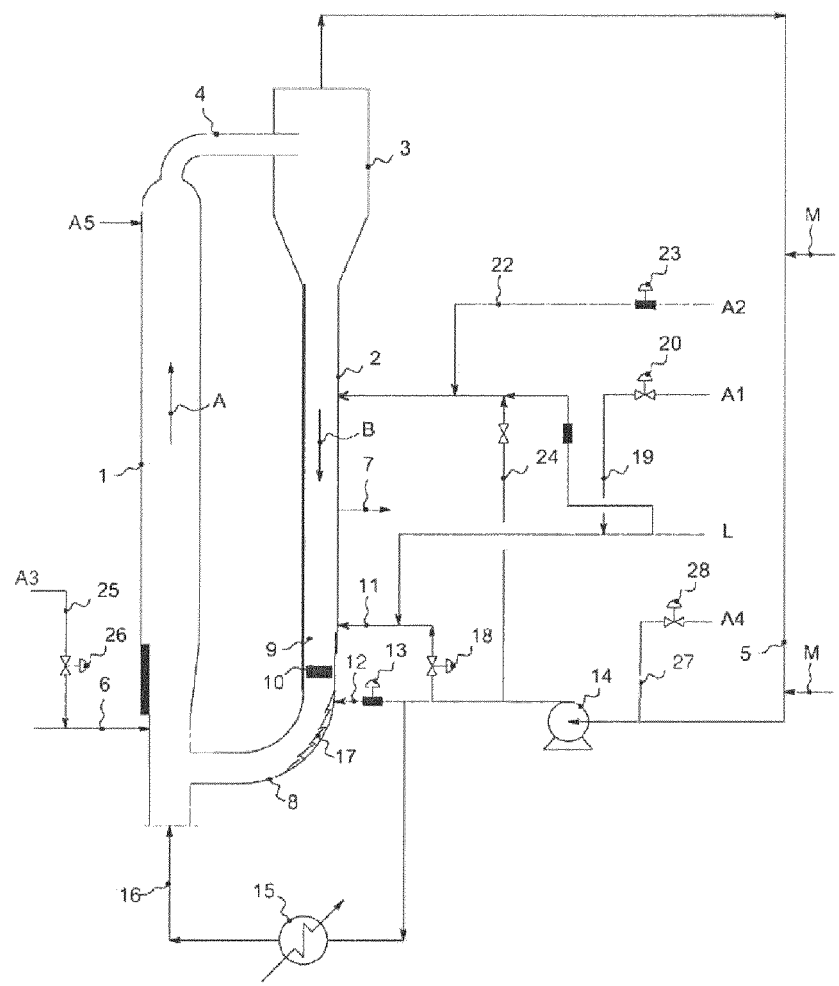
FIG. 2 depicts schematically a set-up of a multizone circulating reactor for carrying out an embodiment of the process for the preparation of polyolefins of the present disclosure.

A gas phase polymerization reactor having two interconnected polymerization zones (riser and downcomer), representing an embodiment, is depicted schematically in FIG. 2.

The polymerization reactor shown in FIG. 2 includes a first polymerization zone 1 (riser), wherein the polymer particles flow upward under fast fluidization conditions along the direction of the arrow A and a second polymerization zone 2 (downcomer), wherein the polymer particles flow downward under the action of gravity along the direction of the arrow B.

The upper portion of the riser 1 is connected to a solid/gas separator 3 by the interconnection section 4. The separator 3 removes the major part of the unreacted monomers from the polymer particles. The polymer withdrawn from the bottom of separator 3 enters the top portion of the downcomer 2. The separated unreacted monomers, optionally together with polymerization diluents flow up to the top of separator 3 and are successively recycled to the bottom of the riser 1 via the recycle line 5. In some embodiments, the diluent is propane.

A mixture made from or containing one or more olefin monomers, hydrogen as the molecular weight regulator, and propane as the polymerization diluent, is fed to the polymerization reactor via one or more lines M, placed along the gas recycle line 5.

The catalyst components, optionally after a prepolymerization step, are continuously introduced into the riser 1 via line 6. The produced polymer is discharged from the reactor via a line 7, which is placed on the lower portion of the downcomer 2. It is believed that due to the packed flow of densified polymer, the quantity of gas entrained with the discharged polymer is minimized. In some embodiments, inserting a control valve on the polymer discharge line 7 permits continuous control of the flow rate of polymer produced by the polymerization reactor. In some embodiments, additional polymer discharge lines with respect to line 7 are placed in the bottom part of the downcomer.

The polymerization reactor includes a transport section 8 connecting the bottom of downcomer 2 with the lower region of the riser 1. The bottom of the downcomer 2 converges into a slight restriction 9. In some embodiments, a control valve 10 with an adjustable opening is placed within the restriction 9. The flow rate Fp of polymer continuously circulated between the downcomer 2 and the riser 1 is adjusted by the level of opening of the control valve 10. In some embodiments, the control valve 10 is a mechanical valve selected from the group consisting of a butterfly valve and a ball valve. A stream of dosing gas is fed into the lower part of the downcomer 2 by line 11 placed at a short distance above the restriction 9. In some embodiments, the dosing gas to be introduced through line 10 is taken from the recycle line 5. In some embodiments, the flow Fp of polymer particles circulated between downcomer 2 and riser 1 is adjusted by varying the opening of the control valve 10 at the bottom of the downcomer or by varying the flow rate of the dosing gas entering the downcomer via line 11. In some embodiments, the flow rate of dosing gas is adjusted by a control valve 18, arranged on line 11.

The transport section 8 is designed as a bend descending from the bottom of downcomer 2 up to the lower region of the riser 1. A carrier gas is introduced via line 12 at the inlet of the transport section 8. The flow rate of carrier gas is adjusted by a control valve 13, arranged on line 12.

The carrier gas is taken from the gas recycle line 5. The gas recycle stream of line 5 is first subjected to compression by a compressor 14. A minor percentage of the recycle stream passes through line 12, thereby entering the transport section 8 and diluting the solid phase of polymer flowing through the transport section 8. The major part of the recycle stream, downstream the compressor 14, is subjected to cooling in a heat exchanger 15 and successively is introduced via line 16 at the bottom of the riser 1 at a high velocity, thereby ensuring fast fluidization conditions in the polymer bed flowing along the riser 1.

The carrier gas merges with the densified polymer coming from downcomer 2 at the inlet portion of transport section 8, after exiting the slits of the gas distribution grid 17. The top end of the distribution grid 17 coincides with the inlet of the transport section 8. The distribution grid 17 extends along the bending of the transport section 8 for an angle α=60°. The gas distribution grid 17 is formed by a plurality of trays fixed to the transport section 8 in a way to form slits in the overlapping area of adjacent trays.

A flow rate A1 of an antistatic composition A is metered via line 19 by valve 20 and then dispersed into a flow rate of liquid monomer L, thereby obtaining a more homogeneous distribution. The dispersion is then pre-mixed with the dosing gas and then fed into the downcomer.

In some embodiments, the antistatic composition is alternatively or additionally metered to positions along the height of the downcomer via nozzles as described in Patent Cooperation Treaty Publication No. WO 2011/029735, incorporated herein by reference. The antistatic composition flow rate A2 in line 22 is metered by one or more valves 23 and then pre-dispersed in the liquid monomer L or a fraction of recycle gas taken from recycle line 5 via line 24.

In some embodiments, the flow rates of antistatic composition are fed into the reactor at the bottom of the riser (flow rate A3, line 25 metered by valve 26 into catalyst feed line 6) or the main gas recycle line 5 (flow rate A4, line 27 metered by valve 28).

In some embodiments, the flow rates of antistatic composition are metered through lines 11 and 12 or at any point in the riser 1. In some embodiments, the flow rates are metered at the top of the riser (flow rate A5).

Depending on the polymer to be produced, the polymerization reactor is operated by adjusting the polymerization conditions and the monomers concentration in the riser and in the downcomer. The process can produce a wide variety of bimodal homopolymers and random copolymers. In some embodiments, the gas mixture entraining the polymer particles and coming from the riser is partially or totally prevented from entering the downcomer, thereby polymerizing two different monomers compositions in the riser and the downcomer. In some embodiments, a gaseous or a liquid barrier stream is fed through a line placed in the upper portion of the downcomer. In some embodiments, the barrier stream has a composition different from the gas composition present inside the riser. In some embodiments, the flow rate of the barrier stream is adjusted, thereby generating an upward flow of gas counter-current to the flow of the polymer particles and acting as a barrier to the gas mixture coming from the riser. In some embodiments, the countercurrent is at the top of the downcomer.

In some embodiments, the polymerization processes are connected in series, thereby forming a polymerization cascade. In some embodiments, a parallel arrangement of reactors of different or identical processes is used.

In some embodiments, gas-phase polymerization processes are carried out in the presence of an alkane having from 3 to 5 carbon atoms as a polymerization diluent. In some embodiments, the diluent is propane.

In some embodiments, the polymer particles have a $MFR_{2.16}$ at a temperature of 190° C. under a load of 2.16 kg of less than about 60 g/10 min being introduced into the multizone circulating reactor, In some embodiments, the process is a cascade process including two or more fluidized-bed gas-phase reactors, wherein the antistatic composition is added into the bed of each reactor, to the polymer discharge downstream each reactor, or before the first reactor.

EXAMPLES

The following examples are given to be illustrative without limiting the scope of this disclosure in any manner whatsoever.

Test Methods

Melt flow rate (MFR "L")

Determined according to ISO 1133 (230° C., 2.16 Kg)

Ethylene Content in Copolymers

The content of ethylene comonomer was determined by infrared spectroscopy by collecting the IR spectrum of the sample vs. an air background with a Fourier Transform Infrared spectrometer (FTIR). The instrument data acquisition parameters were:
- purge time: 30 seconds minimum
- collect time: 3 minutes minimum
- apodization: Happ-Genzel
- resolution: 2 cm-1.

Sample Preparation—Using a hydraulic press, a thick sheet was obtained by pressing about 1 g of sample between two aluminum foils. A small portion was cut from this sheet to mold a film. The film thickness was between 0.02 and 0.05 cm (8-20 mils). The pressing temperature was 180±10° C. (356° F.), and the pressure applied was about 10 kg/cm2 (142.2 PSI) for about one minute. The pressure was released. The sample was removed from the press and cooled to room temperature.

The spectrum of pressed film sample was recorded in absorbance vs. wavenumbers (cm-1). The following measurements were used to calculate ethylene content:
- Area (At) of the combination absorption bands between 4482 and 3950 $cm^{-1}$, used for spectrometric normalization of film thickness;
- Area (AC2) of the absorption band between 750-700 $cm^{-1}$ after two proper consecutive spectroscopic subtractions of an isotactic non-additivated polypropylene spectrum and then of a reference spectrum of an ethylene-propylene random copolymer in the range 800-690 $cm^{-1}$;
- Height (DC4) of the absorption band at 769 $cm^{-1}$ (maximum value), after two proper consecutive spectroscopic subtractions of an isotactic non-additivated polypropylene spectrum and then of a reference spectrum of an ethylene-propylene random copolymer in the range 800-690 $cm^{-1}$.

To calculate the ethylene content, a calibration straight line for ethylene obtained from a reference sample and obtained by plotting AC2/At versus ethylene molar percent (% C2m). The slope GC2 was calculated from a linear regression.

The spectra of the test samples were recorded and then (At), (AC2) and (DC4) calculated. The ethylene content by weight was obtained from the ethylene content (% molar fraction C2m) of the sample calculated as follows:

Xylene Solubles (XS)

$$\% \, C2m = \frac{1}{G_{C2}} \cdot \frac{A_{C2}}{A_t}$$

Determined as follows: 2.5 g of polymer and 250 ml of xylene were introduced in a glass flask equipped with a refrigerator and a magnetic stirrer. The temperature was raised in 30 minutes up to the boiling point of the solvent. The solution was then kept under reflux and stirring for further 30 minutes. The closed flask was then kept in thermostatic water bath at 25° C. for 30 minutes. The formed solid was filtered on quick filtering paper. 100 ml of the filtered liquid was poured in a pre-weighed aluminum container, which was heated on a heating plate under nitrogen flow, to remove the solvent by evaporation. The container was then kept in an oven at 80° C. under vacuum until constant weight was obtained. The weight percentage of polymer soluble in xylene at room temperature was then calculated.

Example 1

Preparation of the Ziegler-Natty Solid Catalyst Component

An initial amount of microspheroidal $MgCl_2 \cdot 2.8C_2H_5OH$ adduct was prepared according to the method described in Example 2 of Patent Cooperation Treaty Publication No. WO98/44009, incorporated herein by reference, but operating on larger scale. The adduct was then partially dealcoholated in a nitrogen flow until the alcohol content reached the value of 50% wt based on the total weight of the adduct.

300 ml of TiCl4 were introduced at room temperature under nitrogen atmosphere into a 500 ml round bottom flask, equipped with mechanical stirrer, cooler and thermometer. After cooling to 0° C., while stirring, diisobutylphthalate (internal donor) and 9.0 g of the adduct were sequentially added into the flask. The amount of internal donor added was to meet a Mg/donor molar ratio of 8. The temperature was raised to 100° C. and maintained for 2 hours. Thereafter, stirring was stopped. The solid product was allowed to settle. The supernatant liquid was siphoned off at 100° C. After the supernatant was removed, additional fresh TiCl4 was added to reach the initial liquid volume again. The mixture was then heated at 120° C. and kept at this temperature for 1 hour. Stirring was stopped again. The solid was allowed to settle. The supernatant liquid was siphoned off. The solid was washed with anhydrous hexane six times in temperature gradient down to 60° C. and one time at room temperature. The solid was then dried under vacuum and analyzed.

Catalyst Activation and Prepolymerization

The solid catalyst component was contacted with aluminum-triethyl (TEAL) and dicyclopentyl-dimetoxysilane (donor D) under the conditions reported in Table 1.

The activated catalyst discharged from the activation vessel was continuously fed, together with liquid propylene, to a prepolymerization loop reactor operated at a temperature of 20° C. and a residence time of 7 minutes.

Polymerization

The polymerization run was conducted in continuous mode in a series of two reactors equipped with devices to transfer the product from the first to the second reactor. The first reactor was a liquid phase loop reactor, and the second was a fluidized bed gas-phase reactor. The prepolymerized catalyst was discharged from the prepolymerization reactor and fed continuously to a liquid phase loop reactor. A propylene homopolymer was prepared in the liquid loop reactor while an ethylene copolymer was prepared in the gas-phase reactor in the presence of the propylene homopolymer coming from the first stage. Liquid propylene was continuously fed to the loop reactor. Make-up propylene and hydrogen as molecular weight regulator were fed to the loop reactor. A polypropylene slurry was discharged from the loop reactor and allowed to flow continuously through a transfer line including a externally-heated pipe.

An antistatic composition made from or containing 7% w, based upon the total weight of the antistatic composition, of water and 93% w, based upon the total weight of the antistatic composition, of Polyglykol PE-K 270 commercialized by Clariant was fed partly to the polymer discharged from the loop reactor upstream the inlet of the jacketed pipe and partly into the gas phase reactor. The flow rate of the antistatic composition feed was to obtain the amounts of antistatic indicated in Table 1.

The polymer slurry entered the steam jacketed pipe and heated to 85° C., with consequent evaporation of the liquid phase. The stream of polypropylene and evaporated propylene obtained at the outlet of the pipe was sent to a flash tank, where the evaporated monomer was separated from the polymer particles. The flash tank was operated at the pressure of 18 bar. The particles of solid polymer fell by gravity towards the bottom of the tank while the gaseous phase exiting from the top was sent to the monomer recovery section. Polypropylene particles were discharged from the bottom of flash tank and conveyed to a downstream gas phase reactor. The gas phase (propylene, ethylene and hydrogen) was continuously analyzed via gas-chromatography. At the end of the run, the powder was discharged and dried under a nitrogen flow.

The main polymerization conditions and polymer features are reported in Table 1 together with the effect of the antistatic composition.

Figure 3:
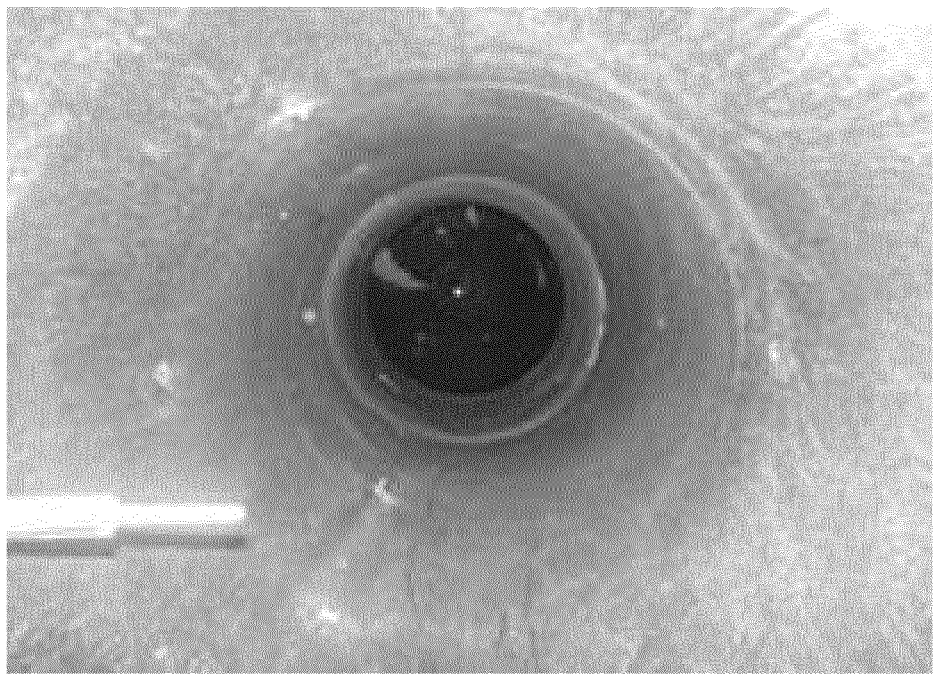
FIG. 3 shows the inner reactor surface after the polymerization run of Example 1.
Figure 4:
FIG. 4 shows the heat exchanger after the polymerization run of Example 1.

Visual inspection of the reactor surface (FIG. 3) and heat exchanger (FIG. 4) showed that both were clean, namely there was no formation of sheeting or adhesion of polymer particles.

Example 2C (Comparative)

Figure 5:
FIG. 5 shows the inner reactor surface after the polymerization run of Example 2C.
Figure 6:
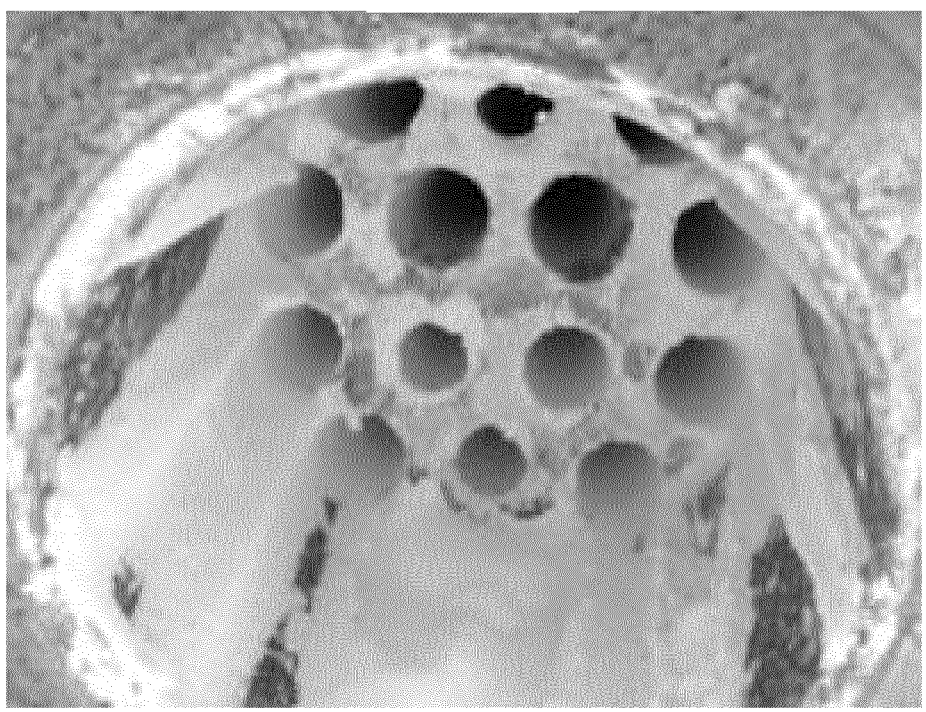
FIG. 6 shows the heat exchanger after the polymerization run of Example 2C.

Example 1 was repeated with the difference that the antistatic agent used was water alone. Visual inspection of the reactor surface (FIG. 5) and heat exchanger (FIG. 6) showed that the reactor surface was clean while the heat exchanger was fouled.

Example 3C (Comparative)

Figure 7:
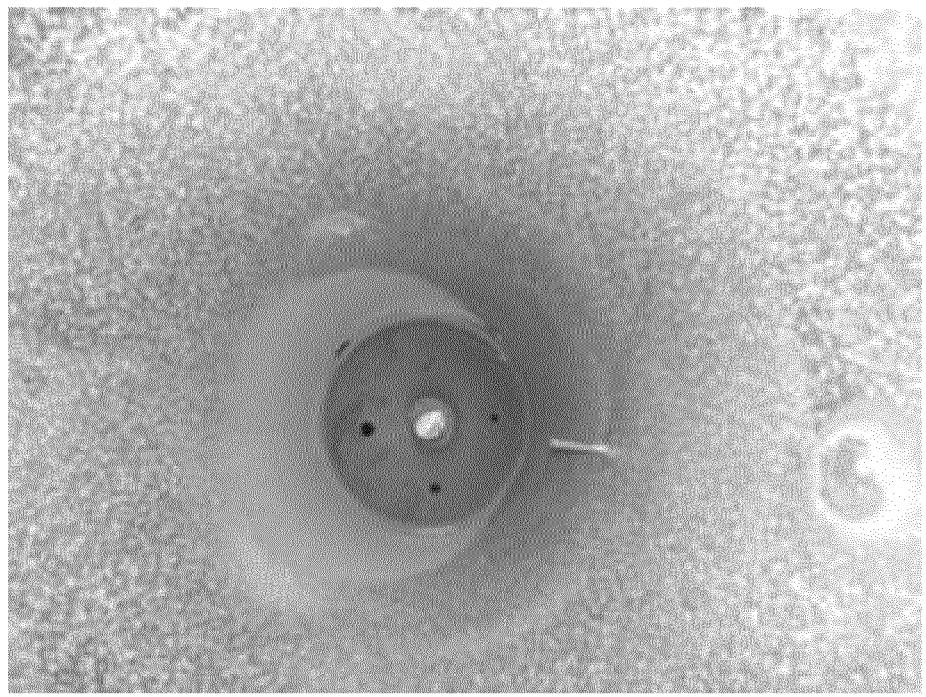
FIG. 7 shows the inner reactor surface after the polymerization run of Example 3C.
Figure 8:
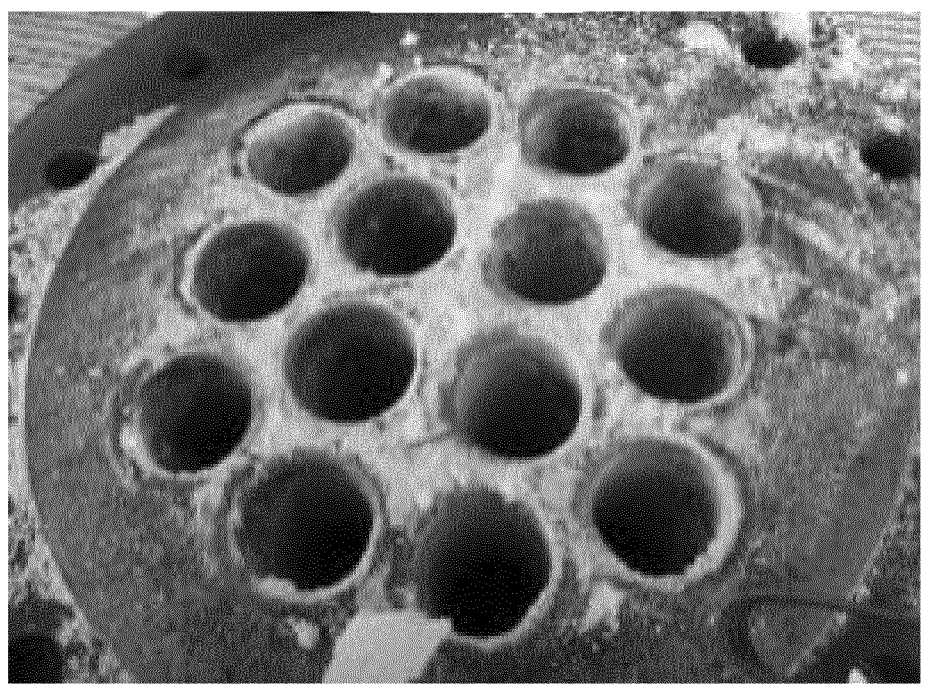
FIG. 8 shows the heat exchanger after the polymerization run of Example 3C.

Example 1 was repeated with the difference that the antistatic agent used was PE-K 270 alone. Visual inspection of the reactor surface (FIG. 7) and heat exchanger (FIG. 8) showed that the reactor surface was fouled while the heat exchanger was clean.

TABLE 1

| | Example | | |
|---|---|---|---|
| | 1 | 2C | 3C |
| Precontact | | | |
| Temperature (° C.) | 12 | 12 | 12 |
| Residence time (min) | 31 | 32 | 32 |
| TEAL/catalyst (g/g) | 8 | 8 | 8 |
| TEAL/donor ratio (g/g) | 6 | 6 | 6 |
| Prepolymerization | | | |
| Temperature (° C.) | 20 | 20 | 20 |
| Residence time (min) | 7 | 7 | 7 |
| Loop reactor in liquid phase - propylene homopolymerization | | | |
| Temperature (° C.) | 70 | 70 | 70 |
| Pressure (barg) | 40 | 40 | 39 |
| Residence time (min) | 56 | 65 | 54 |
| Split (%) | 70 | 73 | 74 |
| Gas-Phase reactor - ethylene/propylene copolymerization | | | |
| Temperature (° C.) | 80 | 80 | 80 |
| Pressure (barg) | 17 | 17 | 17 |
| Residence time (min) | 17 | 18 | 12 |
| $C_2^-/C_2^- + C_3^-$ (mol/mol) | 0.49 | 0.50 | 0.45 |
| $H_2/C_2^-$ (mol/mol) | 0.09 | 0.08 | 0.09 |
| Split (%) | 30 | 27 | 26 |
| Mileage (kg/g) | 44 | 38 | 48 |
| Polymer analysis | | | |
| MFR "L" (dg/min) | 13 | 14 | 14 |
| Ethylene content (wt %) | 16.0 | 16.0 | 13.9 |
| Xylene solubles (wt %) | 26.0 | 22.0 | 23.1 |
| Effect of antistatic composition | | | |
| Antistatic composition Type | $H_2O$ + PE-K270 | $H_2O$ | PE-K270 |
| Amount (ppm wt) | 260 | 30 | 310 |
| Water/TEAL (mol/mol) | 0.63 | 0.90 | — |
| Reactor surface | clean | clean | fouled |
| Heat exchanger | clean | severely fouled | clean |
| Operability | very stable | unstable | stable |

Notes:
$C_2^-$ = ethylene;
$C_3^-$ = propylene;
$H_2$ = hydrogen;
Split = amount of polymer prepared in the concerned reactor referred to the total weight;
Mileage = amount of obtained polymer per amount of catalyst fed to the polymerization.

What is claimed is:
1. A process for the preparation of polyolefins comprising the step of:
(i) polymerizing an olefin in the presence of an antistatic composition comprising:

(a) from about 0.5 to about 50% by weight, based upon the total weight of the antistatic composition, of a compound of formula R—OH wherein R represents hydrogen or a linear or branched, saturated alkyl group having from 1 to 15 carbon atoms; and (b) from about 50 to about 99.5% by weight, based upon the total weight of the antistatic composition, of an oligomeric or polymeric organic compound having one or more terminal hydroxyl groups and a viscosity at 40° C. of 60 to about 2000 mm$^2$/sec (DIN 51562), wherein the oligomeric or polymeric organic compound (b) is an alkylene-oxide-derived polymer comprising on average from 10 to 200 repeating units —(CH$_2$—CHR—O)—, with R being hydrogen or an alkyl group having from 1 to 6 carbon atoms.

2. The process according to claim 1, wherein the compound (a) of formula R—OH is water.

3. The process according to claim 1, wherein the compound (a) of formula R—OH is an alcohol selected from the group consisting of methanol, ethanol, 1-propanol, 1-butanol, 1-pentanol, 1-hexanol, 1-heptanol, 1-octanol, 1-nonanol, 1-decanol, undecan-1-ol, dodecan-1-ol, tridecan-1-ol, 1-tetradecanol, pentadecan-1-ol, isobutanol, isoamyl alcohol, 2-methyl-1-propanol, phenethyl alcohol, tryptophol, isopropanol, 2-butanol, 2-pentanol, 2-hexanol, 2-heptanol, cyclohexanol, tert-butyl alcohol, tert-amyl alcohol, 2-methyl-2-pentanol, 2-methylhexan-2-ol, 2-methylheptan-2-ol, 3-methyl-3-pentanol, and 3-methyloctan-3-ol.

4. The process according to claim 1, wherein the oligomeric or polymeric organic compound (b) has a viscosity at 40° C. in the range of about 260 to about 285 mm$^2$/sec (DIN 51562).

5. The process according to claim 1, wherein the alkylene-oxide-derived polymer comprises on average from 12 to 200 repeating units —(CH$_2$—CHR—O)—.

6. The process according to claim 5, wherein the terminal groups of the alkylene-oxide-derived polymer are —OH groups.

7. The process according to claim 5, wherein the alkylene-oxide-derived polymer is a random copolymer of ethylene oxide and another alkylene oxide, and the repeating units —(CH$_2$—CH$_2$—O)$_n$— derived from ethylene oxide to repeating units —(CH$_2$—CHR'—O)$_m$— derived from the other alkylene oxides, with R' being an alkyl group having from 1 to 6 carbon atoms, are present in a ratio n:m in the range of from 6:1 to 1:1.

8. The process according to claim 5, wherein the alkylene-oxide-derived polymer is a linear polymer of formula (I)

$$\text{HO—(CH}_2\text{—CH}_2\text{—O)}_n\text{—(CH}_2\text{—CHR'—O)}_m\text{—H} \quad (I)$$

wherein R' is an alkyl group having from 1 to 6 carbon atoms; n is in the range of from 10 to 180; and m is in the range of from 2 to 120.

9. The process according to claim 5, wherein the alkylene-oxide-derived polymer is a random copolymer of ethylene oxide and propylene oxide.

10. The process according to claim 9, wherein the ethylene oxide/propylene oxide random copolymer is a linear ethylene oxide/propylene oxide copolymer of formula (II)

$$\text{HO—(CH}_2\text{—CH}_2\text{—O)}_n\text{—(CH}_2\text{—CH(CH}_3\text{)—O)}_m\text{—H} \quad (II)$$

wherein n is in the range of from 10 to 180 and m is in the range of from 2 to 120.

11. An antistatic composition comprising:

(a) from about 0.5 to about 50% by weight, based upon the total weight of the antistatic composition, of a compound of formula R—OH wherein R represents hydrogen or a linear or branched, saturated alkyl group having from 1 to 15 carbon atoms; and (b) from about 50 to about 99.5% by weight, based upon the total weight of the antistatic composition, of an oligomeric or polymeric organic compound having one or more terminal hydroxyl groups and a viscosity at 40° C. of 60 to about 2000 mm$^2$/sec (DIN 51562)

wherein the oligomeric or polymeric organic compound (b) is an alkylene-oxide-derived polymer comprising on average from 10 to 200 repeating units —(CH$_2$—CHR—O)—, with R being hydrogen or an alkyl group having from 1 to 6 carbon atoms.

12. The antistatic composition according to claim 11, wherein the compound (a) of formula R—OH is water.

13. The antistatic composition according to claim 11, wherein the oligomeric or polymeric organic compound (b) is a linear ethylene oxide/propylene oxide copolymer of formula (II)

$$\text{HO—(CH}_2\text{—CH}_2\text{—O)}_n\text{—(CH}_2\text{—CH(CH}_3\text{)—O)}_m\text{—H} \quad (II)$$

wherein n is in the range of from 10 to 180 and m is in the range of from 2 to 120.

\* \* \* \* \*

UNITED STATES PATENT AND TRADEMARK OFFICE
CERTIFICATE OF CORRECTION

PATENT NO. : 10,604,645 B2  
APPLICATION NO. : 16/064900  
DATED : March 31, 2020  
INVENTOR(S) : Mazzucco et al.

Page 1 of 1

It is certified that error appears in the above-identified patent and that said Letters Patent is hereby corrected as shown below:

On the Title Page

Column 1, Item (30), Line 1, delete "15201730" and insert -- 15201730.7 --, therefor  
Column 1, Item (30), Line 2, delete "16180369" and insert -- 16180369.7 --, therefor Signed and Sealed this  
Eighth Day of November, 2022

Katherine Kelly Vidal  
*Director of the United States Patent and Trademark Office*